United States Patent
Iida et al.

(10) Patent No.: US 10,069,539 B2
(45) Date of Patent: Sep. 4, 2018

(54) COMMUNICATION DEVICE, COMMUNICATION SYSTEM, AND COMMUNICATION METHOD

(71) Applicant: Sony Corporation, Tokyo (JP)

(72) Inventors: Yasuhiro Iida, Tokyo (JP); Kazukuni Takanohashi, Tokyo (JP); Kenichi Kobayashi, Tokyo (JP); Kazuhiro Oguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 21 days.

(21) Appl. No.: 14/892,813

(22) PCT Filed: May 19, 2014

(86) PCT No.: PCT/JP2014/063156
§ 371 (c)(1),
(2) Date: Nov. 20, 2015

(87) PCT Pub. No.: WO2014/192569
PCT Pub. Date: Dec. 4, 2014

(65) Prior Publication Data
US 2016/0119035 A1  Apr. 28, 2016

(30) Foreign Application Priority Data

May 28, 2013 (JP) ................. 2013-112237

(51) Int. Cl.
*H04B 5/00* (2006.01)
*H04W 4/80* (2018.01)
(Continued)

(52) U.S. Cl.
CPC ....... *H04B 5/0075* (2013.01); *G06K 7/10009* (2013.01); *H04B 5/0031* (2013.01); *H04L 27/02* (2013.01); *H04W 4/80* (2018.02)

(58) Field of Classification Search
CPC .. H04B 5/0075; H04B 7/0888; H04B 5/0081; H04B 5/0031; H04W 4/008; H04L 27/02; G06K 7/0009
(Continued)

(56) References Cited

U.S. PATENT DOCUMENTS

2002/0008612 A1* 1/2002 Wuidart ............... G06K 7/0008
340/10.4
2005/0280510 A1* 12/2005 Caruana ............... H04B 5/0056
340/10.4
2008/0065877 A1* 3/2008 Son ..................... H04L 63/0428
713/151
(Continued)

FOREIGN PATENT DOCUMENTS

JP  2007-124459 A  5/2007
JP  2008-167259 A  7/2008
(Continued)

*Primary Examiner* — Edward Urban
*Assistant Examiner* — Max Mathew
(74) *Attorney, Agent, or Firm* — Michael Best & Friedrich LLP

(57) ABSTRACT

There may be included: a demodulation section configured to perform, based on a modulated signal transmitted from an associated communication device, amplitude change demodulation and phase change demodulation, and configured to select a demodulated signal demodulated with either one of the amplitude change demodulation and the phase change demodulation; and a modulation section configured to modulate magnetic field generated by the associated communication device.

2 Claims, 5 Drawing Sheets

(51) Int. Cl.
*G06K 7/10* (2006.01)
*H04L 27/02* (2006.01)

(58) Field of Classification Search
USPC ........................................ 455/41.1
See application file for complete search history.

(56) References Cited

U.S. PATENT DOCUMENTS

| | | | |
|---|---|---|---|
| 2009/0043361 A1* | 2/2009 | Baumgartner | A61N 1/37211 607/60 |
| 2009/0079543 A1* | 3/2009 | Nonaka | G06K 7/0008 340/10.1 |
| 2009/0160625 A1* | 6/2009 | Miyagawa | H04B 5/0081 340/10.51 |
| 2010/0073137 A1* | 3/2010 | Kobayashi | G06K 19/0723 340/10.1 |
| 2011/0063519 A1* | 3/2011 | Hasegawa | H04L 27/0014 348/726 |
| 2011/0141962 A1* | 6/2011 | Kim | H04H 20/67 370/312 |
| 2011/0291811 A1* | 12/2011 | Nakano | H04B 5/0093 340/10.4 |
| 2014/0133541 A1* | 5/2014 | Hasegawa | H04L 25/03949 375/230 |
| 2014/0185694 A1* | 7/2014 | Akahori | H04B 1/1009 375/257 |

FOREIGN PATENT DOCUMENTS

| | | |
|---|---|---|
| JP | 2009-118070 A | 5/2009 |
| JP | 2009-239842 A | 10/2009 |
| JP | 2010-109782 A | 5/2010 |
| JP | 2011-087212 A | 4/2011 |
| JP | 2012-212278 A | 11/2013 |

* cited by examiner

[FIG. 1]
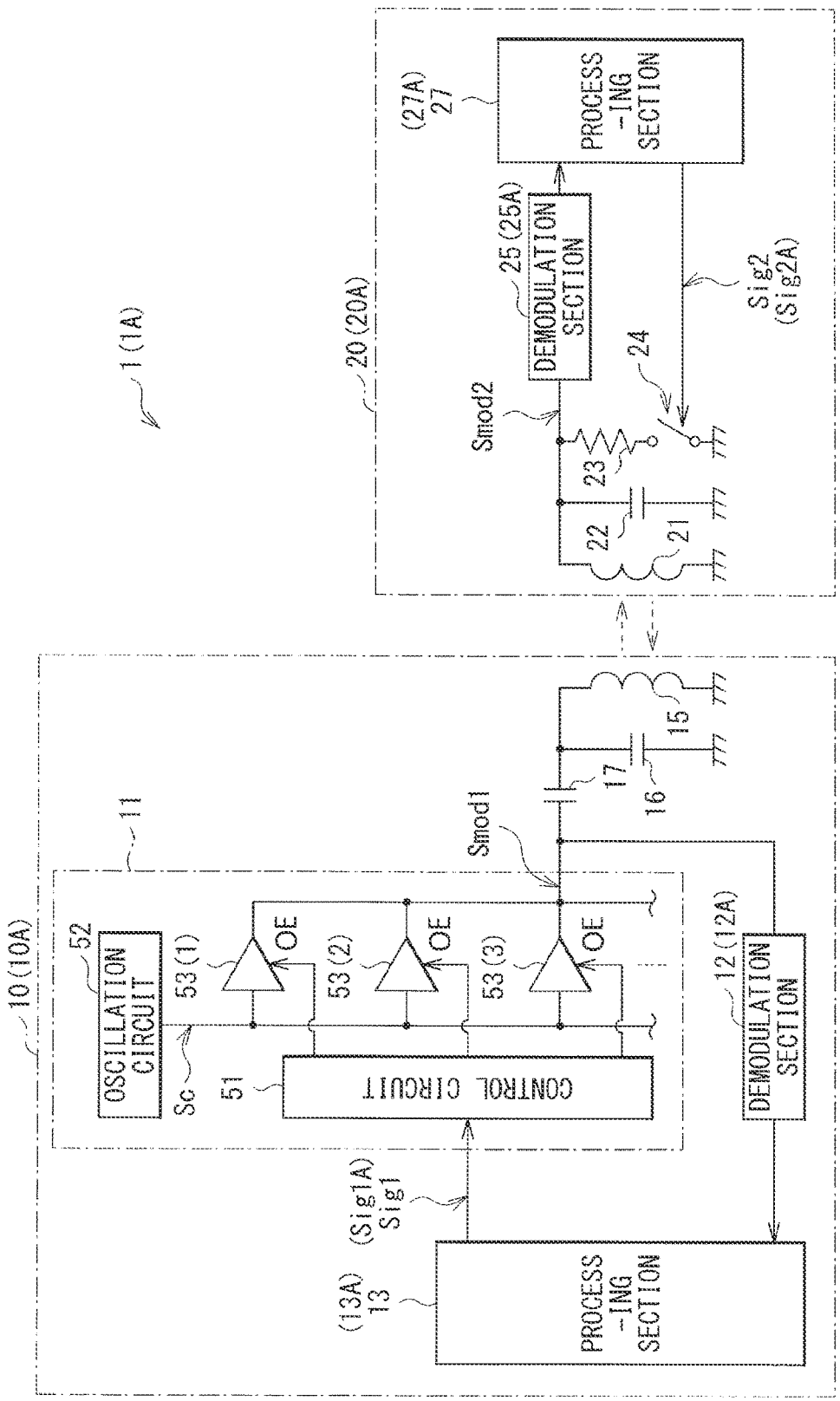

[ FIG. 2 ]
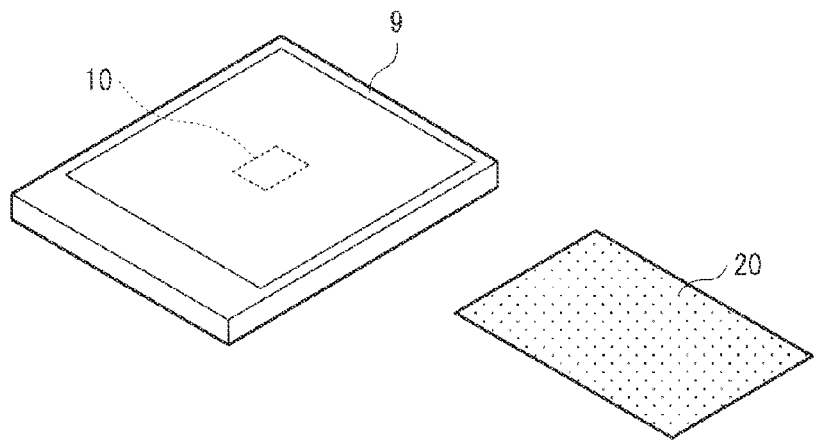
[ FIG. 3 ]
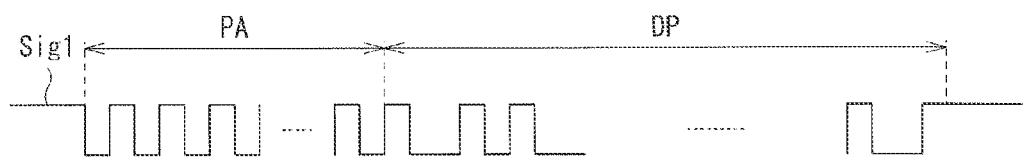
[ FIG. 4 ]
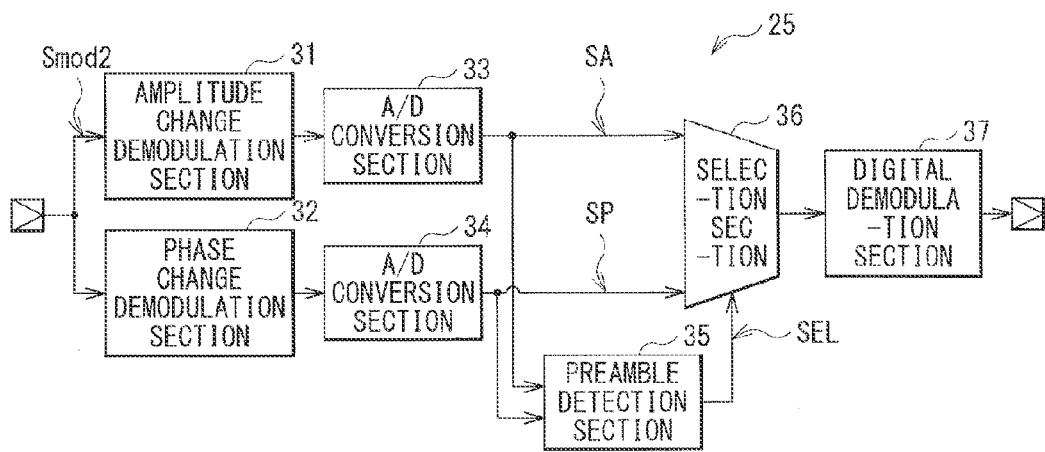

[ FIG. 5A ]
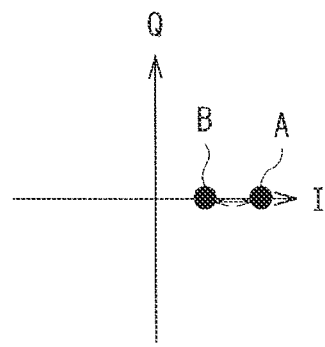
[ FIG. 5B ]
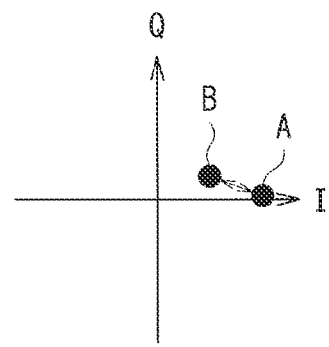
[ FIG. 5C ]
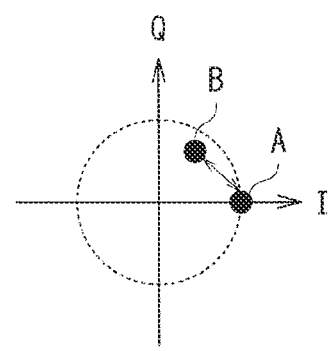

[FIG.6]
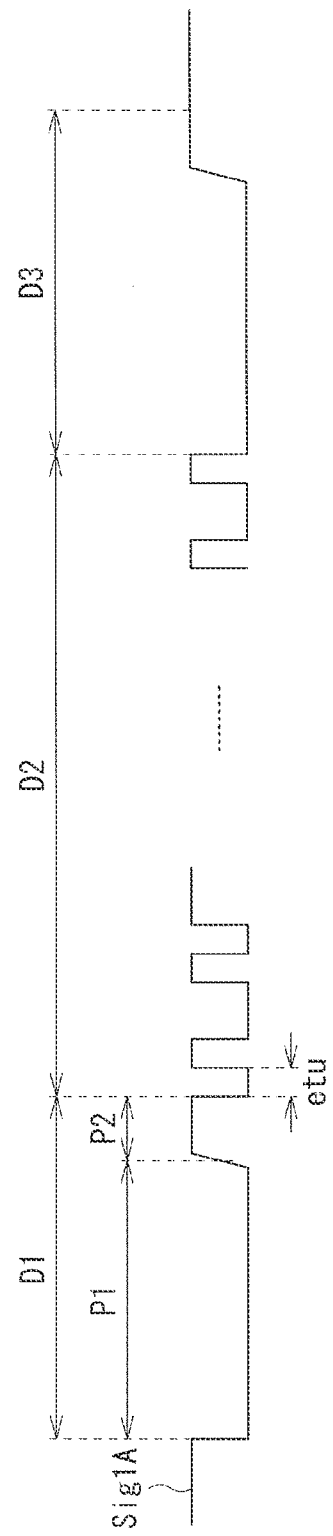

[ FIG. 7 ]
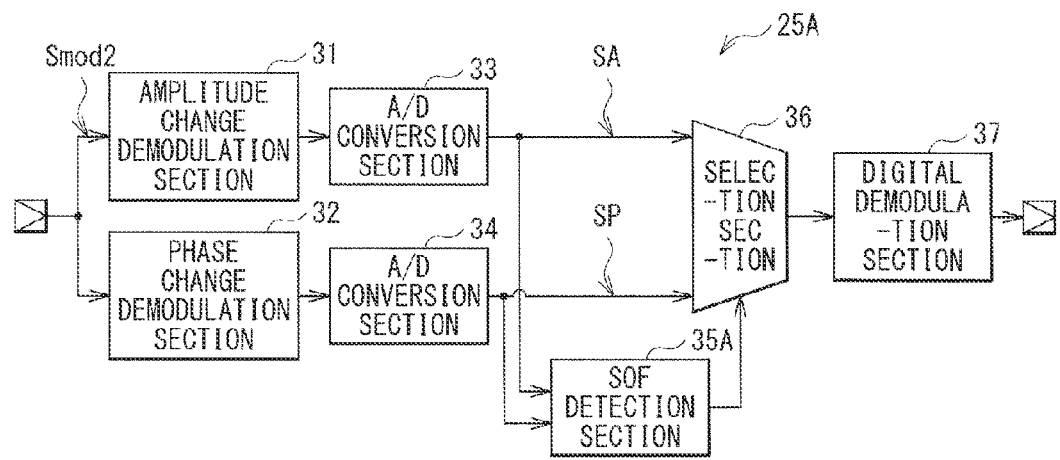
[ FIG. 8 ]
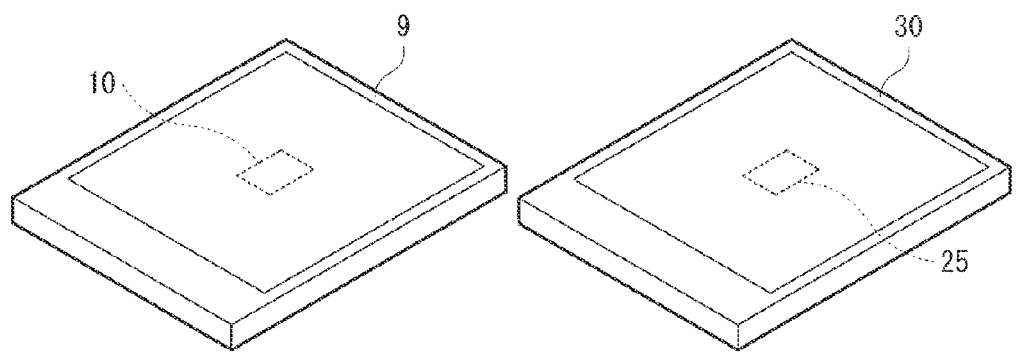

COMMUNICATION DEVICE, COMMUNICATION SYSTEM, AND COMMUNICATION METHOD

TECHNICAL FIELD

The present disclosure relates to a communication device, a communication system, and a communication method to perform near field communication.

BACKGROUND ART

In recent years, IC cards have been used for tickets in traffic facilities such as trains, buses, etc., electronic money, etc. Such IC cards exchange information with reader writers via near field communication (so-called contactless communication). This communication is standardized in accordance with, for example, the international standard ISO/IEC 14443-2 (Type A and Type B) or the international standard ISO/IEC 18092. In these standards, reader writers (initiators) and IC cards (targets) are specified to perform communication by means of ASK (Amplitude Shift Keying) modulation.

Various techniques have been disclosed concerning demodulation circuits used for such near field communication. For example, Patent Literature 1 discloses a demodulation circuit that performs demodulation with orthogonal detection (in a phase change demodulation mode) in an application to a reader writer, and performs demodulation with analog envelope detection or the orthogonal detection (in an amplitude change demodulation mode) in an application to an IC card. Also, Patent Literature 2 discloses a demodulation circuit for a reader writer; the demodulation circuit includes an ASK detection circuit and a phase detection circuit, and uses, out of an output signal of the ASK detection circuit and an output signal of the phase detection circuit, either one with a higher average amplitude level.

CITATION LIST

Patent Literature

Patent Literature 1: JP 2011-87212A
Patent Literature 2: JP 2009-118070A

SUMMARY OF INVENTION

Here, it is generally desirable that communication be performed with few errors; also, in near field communication, high communication quality is desired.

It is therefore desirable to provide a communication device, a communication system, and a communication method that make it possible to enhance communication quality.

A communication device according to an embodiment of the present disclosure includes: a demodulation section; and a modulation section. The demodulation section is configured to perform, based on a modulated signal transmitted from an associated communication device, amplitude change demodulation and phase change demodulation, and is configured to select a demodulated signal demodulated with either one of the amplitude change demodulation and the phase change demodulation. The modulation section is configured to modulate magnetic field generated by the associated communication device.

A communication system according to an embodiment of the present disclosure includes: a first communication device; and a second communication device. The first communication device includes a demodulation section configured to perform, based on a modulated signal transmitted from the second communication device, amplitude change demodulation and phase change demodulation, and configured to select a demodulated signal demodulated with either one of the amplitude change demodulation and the phase change demodulation, and a modulation section configured to modulate magnetic field generated by the second communication device.

A communication method according to an embodiment of the present disclosure includes: receiving a signal by performing, based on a modulated signal transmitted from an associated communication device, amplitude change demodulation and phase change demodulation, and by selecting a demodulated signal demodulated with either one of the amplitude change demodulation and the phase change demodulation; and transmitting a signal by modulating magnetic field generated by the associated communication device.

In the communication device, the communication system, and the communication method according to the above-described embodiments of the present disclosure, the amplitude change demodulation and the phase change demodulation are performed based on the modulated signal transmitted from the associated communication device. The demodulated signal demodulated with either one of these is selected, allowing the signal reception to be performed. The magnetic field generated by the associated communication device is modulated, allowing the signal transmission to be performed.

According to the communication device, the communication system, and the communication method according to the embodiments of the present disclosure, the amplitude change demodulation and the phase change demodulation are performed based on the modulated signal transmitted from the associated communication device. The demodulated signal demodulated with either one of these is selected, allowing the signal to be received. The magnetic field generated by the associated communication device is modulated, allowing the signal to be transmitted. Hence, it is possible to enhance communication quality.

BRIEF DESCRIPTION OF DRAWINGS

FIG. 1 is a block diagram illustrating one configuration example of a communication system according to an embodiment of the present disclosure.

FIG. 2 is an explanatory diagram illustrating an application example of the communication system illustrated in FIG. 1.

FIG. 3 is a waveform chart illustrating an example of a signal inputted to a modulation section illustrated in FIG. 1.

FIG. 4 is a block diagram illustrating one configuration example of a demodulation section illustrated in FIG. 1.

FIG. 5A is an explanatory diagram illustrating a signal state in the communication system illustrated in FIG. 1.

FIG. 5B is an explanatory diagram illustrating another signal state in the communication system illustrated in FIG. 1.

FIG. 5C is an explanatory diagram illustrating another signal state in the communication system illustrated in FIG. 1.

FIG. 6 is a waveform chart illustrating an example of a signal inputted to a modulation section according to a modification example.

FIG. 7 is a block diagram illustrating one configuration example of a demodulation section according to a modification example.

FIG. 8 is an explanatory diagram illustrating another application example of the communication system.

DESCRIPTION OF EMBODIMENTS

In the following, some embodiments of the present disclosure will be described in detail with reference to the drawings.

Configuration Example

FIG. 1 illustrates one configuration example of a communication system 1 according to an embodiment. The communication system 1 may be a communication system configured to exchange information via near field communication (so-called contactless communication). It is to be noted that, since a communication device and a communication method according to the embodiments of the present disclosure are embodied by the present embodiment, description thereof will be made together. The communication system 1 includes a reader writer 10 and an IC card 20.

The reader writer 10 and the IC card 20 may exchange information via near field communication standardized in accordance with the international standard ISO/IEC 18092. This standard is used in, for example, FeliCa (registered trademark), etc. The reader writer 10 is configured to write information in the IC card 20, or to read information out of the IC card 20. In communication between the reader writer 10 and the IC card 20, the reader writer 10 may serve as a so-called initiator, while the IC card 20 may serve as a so-called target. In other words, in the communication between the reader writer 10 and the IC card 20, first, the reader writer 10 may perform communication with the IC card 20, and the IC card 20 may respond thereto, allowing a link to be formed.

FIG. 2 illustrates an application example of the reader writer 10. The reader writer 10, in this example, may be incorporated in a mobile phone 9. Mobile information terminals such as the mobile phone 9 are generally driven by a battery, and reduction in power consumption is strongly desired. The reader writer 10 may be configured to allow for incorporation in such a mobile information terminal by reducing power consumption in performing communication, as described later.

(Reader Writer 10)

The reader writer 10 may include a processing section 13, a modulation section 11, a demodulation section 12, an air core coil 15, and condensers 16 and 17.

The processing section 13 is configured to generate a signal Sig1 and to supply the signal Sig1 to the modulation section 11 when transmitting a signal to the IC card 20, and is configured to perform predetermined processing based on a signal supplied from the demodulation section 12 when receiving a signal from the IC card 20.

FIG. 3 illustrates a waveform example of the signal Sig1 when transmitted. The signal Sig1 may be configured of a preamble PA and a data packet DP. The preamble PA may be disposed in front of the data packet DP, and may be provided for synchronization of communication. The preamble PA may include an alternate, predetermined signal pattern. Specifically, the preamble PA is specified to be an alternate pattern of 48 bits or more in the international standard ISO/IEC 18092. The data packet DP may correspond to a main part of data to be transmitted.

The modulation section 11 is configured to perform ASK modulation processing based on the signal Sig1 when transmitting a signal to the IC card 20, and to generate a transmission signal Smod1. The modulation section 11 may include a control circuit 51, an oscillation circuit 52, and N buffers 53(1) to 53(N). In the following, any one of the N buffers 53(1) to 53(N) is referred to as a "buffer 53" as appropriate.

The control circuit 51 is configured to determine, based on the signal Sig1, the number of the buffers 53 to be used out of the N buffers 53(1) to 53(N), and to supply, to an output enable terminal OE of each of the buffers 53(1) to 53(N), a control signal indicating whether or not the relevant buffer 53 is used. The modulation section 11 is configured to change the number of the buffers 53 to be used, as described later, allowing for a dynamic change of drive capability to perform the ASK modulation.

The oscillation circuit 52 is configured to generate a carrier signal Sc. The carrier signal Sc may be, for example, a sine wave or a square wave, and its frequency may be 13.56 MHz in this example.

Each of the buffers 53(1) to 53(N) is configured to output, through an output terminal, the carrier signal Sc supplied to an input terminal, based on the control signal supplied to the output enable terminal OE, and to drive a load. The input terminals of the respective buffers 53(1) to 53(N) may be coupled to one another, may be coupled to the oscillation circuit 52, and may be supplied with the carrier signal Sc. The output terminals of the respective buffers 53(1) to 53(N) may be coupled to one another, and may be coupled to one end of the condenser 17, etc. Moreover, the output enable terminals OE of the respective buffers 53(1) to 53(N) may be coupled to the control circuit 51, and may be supplied with the respective control signals.

With this configuration, the modulation section 11 may modulate (ASK modulate), based on the signal Sig1, amplitude of the carrier signal Sc so as to generate the transmission signal Smod1. At this occasion, the modulation section 11 may change amplitude of the transmission signal Smod1 in accordance with the number of the buffers 53 to be used. Specifically, the modulation section 11 may increase the number of the buffers 53 to be used so as to increase the amplitude of the transmission signal Smod1, and may reduce the number of the buffers 53 to be used so as to decrease the amplitude of the transmission signal Smod1. In other words, the modulation section 11 may dynamically change the drive capability so as to perform the ASK modulation. In this way, the modulation section 11 may allow for reduction in power consumption, as compared to a case in which a modulation section is configured of, for example, a linear amplifier whose gain changes based on the signal Sig1 with the carrier signal Sc as an input. As a result, it is possible to mount the reader writer 10 on a mobile information terminal having strict restriction on power consumption.

The demodulation section 12 is configured to perform demodulation processing based on a signal received from the IC card 20.

The air core coil 15 may serve as an antenna when communication is conducted between the reader writer 10 and the IC card 20. One end of the air core coil 15 may be coupled to one end of the condenser 16, and may be coupled to another end of the condenser 17. Another end of the air core coil 15 may be grounded. The one end of the condenser 16 may be coupled to the one end of the air core coil 15, and may be coupled to the other end of the condenser 17. Another end of the condenser 16 may be grounded. The one end of the condenser 17 may be coupled to the output terminals of the buffers 53(1) to 53(N), and may be coupled to an input terminal of the demodulation section 12. The other end of the condenser 17 may be coupled to the one end of the condenser 16 and to the one end of the air core coil 15. In other words, the air core coil 15 and the condenser 16 may constitute a parallel resonance circuit, and the condenser 17 may AC couple the parallel resonance circuit to the modulation section 11 and the demodulation section 12. A resonance frequency of the parallel resonance circuit may be specified to the frequency of the carrier signal Sc (13.56 MHz in this example).

(IC Card 20)

The IC card 20 may include a processing section 27, an air core coil 21, a condenser 22, a resistor 23, a switch 24, and a demodulation section 25.

The processing section 27 is configured to generate a signal Sig2 and to supply the signal Sig2 to the switch 24 when transmitting a signal to the reader writer 10, and is configured to perform predetermined processing based on a signal supplied from the demodulation section 25 when receiving a signal from the reader writer 10. When transmitted, the signal Sig2 may be configured of the preamble PA and the data packet DP, similarly to the signal Sig1 (FIG. 3).

The air core coil 21 may serve as an antenna when communication is conducted between the reader writer 10 and the IC card 20. One end of the air core coil 21 may be coupled to one end of the condenser 22, and may be coupled to one end of the resistor 23 and an input terminal of the demodulation section 25. Another end of the air core coil 21 may be grounded. The one end of the condenser 22 may be coupled to the one end of the air core coil 21, and may be coupled to the one end of the resistor 23 and the input terminal of the demodulation section 25. Another end of the condenser 22 may be grounded. In other words, the condenser 22 and the air core coil 21 may constitute a parallel resonance circuit. A resonance frequency of the parallel resonance circuit may be specified to the frequency of the carrier signal Sc (13.56 MHz in this example).

The one end of the resistor 23 may be coupled to the one end of the air core coil 21, to the one end of the condenser 22, and to the input terminal of the demodulation section 25. Another end of the resistor 23 may be coupled to one end of the switch 24. The switch 24 may be a switch configured to be turned on and off based on the signal Sig2 supplied from the processing section 27. The one end of the switch 24 may be coupled to the other end of the resistor 23, and another end of the switch 24 may be grounded.

This configuration makes it possible for the IC card 20 to transmit a signal without actively generating magnetic field by itself when transmitting a signal to the reader writer 10. Specifically, when transmitting data from the IC card 20 to the reader writer 10, first, the air core coil 15 of the reader writer 10 may generate stationary alternate magnetic field. Then, the switch 24 of the IC card 20 may be turned on and off in response to the signal Sig2. Thus, at the both ends of the air core coil 15 of the reader writer 10, a signal may be generated in accordance of turning on and off of the switch 24 of the IC card 20. The demodulation section 12 of the reader writer 10 is configured to perform the demodulation processing based on this signal.

On the other hand, when receiving a signal from the reader writer 10, the air core coil 15 of the reader writer 10 may generate alternate magnetic field based on the signal Sig1. Thus, an electromotive force in accordance with the alternate magnetic field may be generated in the air core coil 21 of the IC card 20.

The demodulation section 25 is configured to perform demodulation processing based on a reception signal Smod2 in accordance with the electromotive force generated in the air core coil 21. In the following, description is given on details of a configuration of the demodulation section 25.

FIG. 4 illustrates one configuration example of the demodulation section 25. The demodulation section 25 may include an amplitude change demodulation section 31, a phase change demodulation section 32, A/D (Analog/Digital) conversion sections 33 and 34, a preamble detection section 35, a selection section 36, and a digital demodulation section 37.

The amplitude change demodulation section 31 is configured to perform demodulation processing based on a change in an amplitude component of the reception signal Smod2. The phase change demodulation section 32 is configured to perform demodulation processing based on a change in a phase component of the reception signal Smod2.

The A/D conversion section 33 is configured to A/D convert a demodulated signal supplied from the amplitude change demodulation section 31 to generate a signal SA. The A/D conversion section 34 is configured to A/D convert a demodulated signal supplied from the phase change demodulation section 32 to generate a signal SP.

The preamble detection section 35 is configured to detect the preamble PA based on the signal SA, to detect the preamble PA based on the signal SP, and to generate a control signal SEL indicating a signal whose preamble PA is detected earlier out of the signals SA and SP. The selection section 36 is configured to select, based on the control signal SEL, the signal whose preamble PA is detected earlier out of the signals SA and SP, and to output the selected signal.

The digital demodulation section 37 is configured to perform, based on the signal supplied from the selection section 36, demodulation processing by means of digital signal processing.

With this configuration, in the communication system 1, as described later, it is possible to reduce a communication error rate even in a case in which the reception signal Smod2 becomes a signal closer to PSK modulation rather than ASK modulation when transmitting a signal from the reader writer 10 to the IC card 20.

Here, the IC card 20 corresponds to one concrete example of a "communication device" in the present disclosure. The reader writer 10 corresponds to one concrete example of an "associated communication device" in the present disclosure. The preamble PA corresponds to one concrete example of a "header portion" in the present disclosure. The data packet DP corresponds to one concrete example of a "data portion" in the present disclosure. The signal SA corresponds to one concrete example of a "first demodulated signal" in the present disclosure. The signal SP corresponds to one concrete example of a "second demodulated signal" in the present disclosure.

[Operations and Workings]

Next, description is made on operations and workings of the communication system 1 according to the present embodiment.

(Outline of General Operation)

First, referring to FIGS. 1 and 4, an outline of the general operation of the communication system 1 is described. When transmitting a signal from the reader writer 10 to the IC card 20, the modulation section 11 of the reader writer 10 dynamically changes the drive capability based on the signal Sig1 so as to perform the ASK modulation processing to generate the transmission signal Smod1. Then, the air core coil 15 generates the alternate magnetic field in accordance with the transmission signal Smod1. The air core coil 21 of the IC card 20 generates the electromotive force in accordance with the alternate magnetic field. The demodulation section 25 performs the demodulation processing based on the reception signal Smod2 in accordance with the electromotive force generated in the air core coil 21. Specifically, the amplitude change demodulation section 31 performs the demodulation processing based on the change in the amplitude component of the reception signal Smod2, and its output signal is subjected to A/D conversion by the A/D conversion section 33 to generate the signal SA. The phase change demodulation section 32 performs the demodulation processing based on the change in the phase component of the reception signal Smod2, and its output signal is subjected to A/D conversion by the A/D conversion section 34 to generate the signal SP. The preamble detection section 35 detects the preamble PA based on the signal SA, detects the preamble PA based on the signal SP, and generates the control signal SEL indicating the signal whose preamble PA is detected earlier out of the signals SA and SP. The selection section 36 selects, based on the control signal SEL, the signal whose preamble PA is detected earlier out of the signals SA and SP, and outputs the selected signal. The digital demodulation section 37 performs, based on the signal selected in the selection section 36, the demodulation processing by means of digital signal processing.

When transmitting a signal from the IC card 20 to the reader writer 10, first, the air core coil 15 of the reader writer 10 generates stationary alternate magnetic field. Then, the switch 24 of the IC card 20 is turned on and off based on the signal Sig2. Thus, at the both ends of the air core coil 15 of the reader writer 10, the signal is generated in accordance with the turning on and off of the switch 24 of the IC card 20. The demodulation section 12 of the reader writer 10 performs demodulation processing based on this signal.

(Regarding Demodulation Processing in IC Card 20)

When transmitting a signal from the reader writer 10 to the IC card 20, the modulation section 11 of the reader writer 10 changes, based on the signal Sig1, the number of the buffers 53 to be used, allowing for the dynamic change in the drive capability to perform the ASK modulation processing. In this way, when the IC card 20 receives a signal, in some cases, the reception signal Smod2 may become a signal different from a general ASK modulated wave, depending on a distance d from the reader writer 10 to the IC card 20.

FIGS. 5A to 5C illustrate constellation plots; FIG. 5A indicates a case with the large distance d; FIG. 5B indicates a case with the medium distance d; and FIG. 5C indicates a case with the small distance d. In FIGS. 5A to 5C, horizontal axes indicate an in-phase component I, and vertical axes indicate an orthogonal component Q. In these figures, a signal state A indicates a case in which the number of the buffers 53 to be used is increased, and a signal state B indicates a case in which the number of the buffers 53 to be used is decreased.

When the distance d is large, as illustrated in FIG. 5A, in this example, the signal states A and B are plotted on the axis of the in-phase component I. The signal state A is in a state of larger amplitude, as compared to the signal state B. In other words, in a transition between the signal states A and B, a phase hardly changes, while only amplitude changes.

When the distance d becomes a little smaller, as illustrated in FIG. 5B, in this example, the signal state B is plotted slightly apart from the axis of the in-phase component I. One reason for this may be as follows. Specifically, first, a small distance between the reader writer 10 and the IC card 20 may lead to a higher coupling coefficient of the air core coil 15 of the reader writer 10 to the air core coil 21 of the IC card 20, causing an increase in a load viewed from the modulation section 11 of the reader writer 10. Also, second, in particular in the signal state B, the number of the buffers 53 to be used is small, and the drive capability is low. Thus, in the signal state B, the plot is slightly apart from the axis of the in-phase component I, causing a phase shift. In this case, in a transition between the signal states A and B, not only amplitude but also a phase changes.

When the distance d becomes even smaller, as illustrated in FIG. 5C, in this example, the signal state B is plotted further apart from the axis of the in-phase component I. Thus, in a transition between the signal states A and B, a phase change may become dominant as compared to an amplitude change.

As described above, for example, as the distance d between the reader writer 10 and the IC card 20 becomes smaller, the load viewed from the modulation section 11 of the reader writer 10 increases. Accordingly, when the modulation section 11 of the reader writer 10 dynamically changes the drive capability to perform the ASK modulation, there occurs a phase change. Thus, in some cases, the reception signal Smod2 may become a signal closer to a PSK modulated wave rather than an ASK modulated wave.

Accordingly, when the modulation section in the IC card on the reception side is configured of, for example, only the amplitude change demodulation section 31, it is possible to distinguish the signal states A and B in a case with the large distance d (FIG. 5A, for example); but it is difficult to distinguish the signal states A and B in a case with the small distance d (FIG. 5C, for example), contributing to a lower communication error rate.

On the other hand, in the IC card 20, the demodulation section 25 is configured of both the amplitude change demodulation section 31 and the phase change demodulation section 32, allowing for selection of an appropriate signal, depending on their communication states, from the signal SA outputted from the amplitude change demodulation section 31 and the signal SP outputted from the phase change demodulation section 32. Hence, it is possible to enhance communication quality even when the distance d changes.

Specifically, for example, in a case with the large distance d (FIG. 5A), since the amplitude change is dominant, it may be easy to detect the preamble PA in the signal SA outputted from the amplitude change demodulation section 31, while it may be hard to detect the preamble PA in the signal SP outputted from the phase change demodulation section 32. Accordingly, the preamble detection section 35 may detect the preamble PA in the signal SA earlier than in the signal SP, and the selection section 36 may select the signal SA. Then, the digital demodulation section 37 may perform the demodulation processing based on the signal SA.

On the other hand, for example, in a case with the small distance d (FIG. 5C), since the phase change is dominant, it may be easy to detect the preamble PA in the signal SP outputted from the phase change demodulation section 32, while it may be hard to detect the preamble PA in the signal SA outputted from the amplitude change demodulation section 31. Accordingly, the preamble detection section 35 may detect the preamble PA in the signal SP earlier than in the signal SA, and the selection section 36 may select the signal SP. Then, the digital demodulation section 37 may perform the demodulation processing based on the signal SP.

Thus, the modulation section 11 of the reader writer 10 dynamically changes the drive capability to perform the ASK modulation processing. The demodulation section 25 of the IC card 20 performs the demodulation processing based on the signal whose preamble PA is detected earlier out of the signal SA outputted from the amplitude change demodulation section 31 and the signal SP outputted from the phase change demodulation section 32. This makes it possible to reduce power consumption of the reader writer 10, in particular when a signal is transmitted from the reader writer 10 to the IC card 20. It is also possible to reduce possibility of a lower communication error rate regardless of the distance d.

[Effects]

As described above, in the present embodiment, the demodulation section of the IC card is provided with the amplitude change demodulation section and the phase change demodulation section, allowing the demodulation processing to be performed based on the signal whose preamble is detected earlier out of the output signal from the amplitude change demodulation section and the output signal from the phase change demodulation section. Hence, it is possible to reduce possibility of a lower communication error rate regardless of the distance between the reader writer and the IC card, leading to enhanced communication quality.

Moreover, in the present embodiment, the demodulation section of the reader writer is configured to change the number of the buffers to be used, allowing for the dynamic change in the drive capability to perform the ASK demodulation processing. Hence, it is possible to reduce power consumption, allowing for installation in a mobile information terminal. etc. for which reduction in power consumption is strongly desired.

Modification Example 1

In the forgoing embodiment, the reader writer 10 and the IC card 20 are specified to be used for near field communication standardized in accordance with the international standard ISO/IEC 18092, but this is not limitative. Instead, for example, the reader writer 10 and the IC card 20 may be used for near field communication standardized in accordance with the international standard ISO/TEC 14443-2 (Type B, for example). In the following, description is given on a communication system IA according to the present modification example. The communication system IA includes, as illustrated in FIG. 1, the reader writer 10A and the IC card 20A.

The reader writer 10A may include a processing section 13A and a demodulation section 12A. The processing section 13A is configured to perform processing regarding communication in accordance with the above-described international standard, and may have similar functions to those of the processing section 13 according to the above-described embodiment. The processing section 13A is configured to generate a signal Sig1A and to supply the signal Sig1A to the modulation section 11 when transmitting a signal to the IC card 20A. The demodulation section 12A is configured to perform demodulation processing based on a signal received from the IC card 20A.

FIG. 6 illustrates a waveform example of the signal Sig1A in the reader writer 10A. The signal Sig1A may be configured of an SOF (Start Of Frame) portion D1, a data portion D2, and an EOF (End Of Frame) portion D3. The SOF portion D1 may be disposed in front of the data portion D2 as a main part of data to be transmitted. The EOF portion D3 may be disposed behind the data portion D2. The SOF portion D1 may have a predetermined signal waveform. Specifically, the SOF portion D1 is specified, in the international standard ISO/IEC 14443-2, to have a waveform in which a low level is maintained for a period P1 of 10 [etu] to 11 [etu] both inclusive, and thereafter, a high level is maintained for a period P2 of 2 [etu] to 3 [etu] both inclusive. Here, "etu" (element time unit) is a signal width in the data portion D2, as illustrated in FIG. 6.

The IC card 20A may include a processing section 27A and a demodulation section 25A. The processing section 27A is configured to perform processing regarding communication in accordance with the above-described international standard, and may have similar functions to those of the processing section 27 according to the above-described embodiment. The processing section 27A is configured to generate a signal Sig2A and to supply the signal Sig2A to the switch 24 when transmitting a signal to the reader writer 10A. The signal Sig2A may be a signal obtained by BPSK (Binary Phase Shift Keying) modulating, by means of a signal similar to the signal Sig1A (FIG. 6), a subcarrier having a frequency of 1/16 of the frequency of the carrier signal Sc.

FIG. 7 illustrates one configuration example of the demodulation section 25A. The demodulation section 25A may include an SOF detection section 35A. The SOF detection section 35A is configured to detect the SOF portion D1 based on the signal SA, to detect the SOF portion D1 based on the signal SP, and generate the control signal SEL indicating a signal whose SOF portion D1 is detected earlier out of the signals SA and SP. Then, the selection section 36 may select, based on the control signal SEL, the signal whose SOF portion D1 is detected earlier out of the signals SA and SP, and may output the selected signal.

Here, the SOF portion D1 corresponds to one concrete example of a "header portion" in the present disclosure. The data portion D2 corresponds to one concrete example of a "data portion" in the present disclosure.

In this case as well, it is possible to reduce possibility of a lower communication error rate regardless of a distance between the reader writer 10A and the IC card 20A, leading to enhanced communication quality.

Although description has been made by giving the embodiment and the modification examples as mentioned above, the contents of the present technology are not limited to the above-mentioned example embodiment. etc. and may be modified in a variety of ways.

For example, in the above-described example embodiment, etc., the demodulation section 25 is applied to the IC card 20, but this is not limitative. Instead, for example, as illustrated in FIG. 8, the demodulation section 25 may be applied to a mobile phone 30. Application to other mobile information terminals, etc. may be possible as well. In other words, a target as a partner with whom an initiator makes communication is not limited to the IC card 20.

Moreover, for example, the demodulation section 25 is applied to components on the IC card 20 side, but this is not limitative. Instead, for example, the demodulation section 25 may be applied to components on the reader writer 10 side as well, allowing the demodulation section 12 to have a similar configuration to that of the demodulation section 25.

Moreover, for example, the above-described example embodiment, etc. involve an application to a system that performs communication by means of ASK modulation concerning digital signals, but this is not limitative. The present disclosure may be applicable to any system that performs communication by means of amplitude modulation. Specific examples may include an application to a system that performs communication by means of AM modulation concerning analog signals.

It is to be noted that the contents of the present technology may have the following configurations.

(1) A communication device, including:
a demodulation section configured to perform, based on a modulated signal transmitted from an associated communication device, amplitude change demodulation and phase change demodulation, and configured to select a demodulated signal demodulated with either one of the amplitude change demodulation and the phase change demodulation; and
a modulation section configured to modulate magnetic field generated by the associated communication device.

(2) The communication device according to (1),
wherein the modulated signal includes a data portion and a header portion preceding the data portion, and
the demodulation section selects one of a first demodulated signal and a second demodulated signal based on a portion corresponding to the header portion in the first demodulated signal and the second demodulated signal, the first demodulated signal being demodulated with the amplitude change demodulation, and the second demodulated signal being demodulated with the phase change demodulation.

(3) The communication device according to (2),
wherein the demodulation section selects, out of the first demodulated signal and the second demodulated signal, the demodulated signal whose header portion is detected earlier, and outputs the selected demodulated signal.

(4) The communication device according to (2) or (3),
wherein the communication device is configured to perform communication with the associated communication device via near field communication.

(5) The communication device according to (4),
wherein the near field communication is standardized in accordance with ISO/IEC 18092, and
the header portion is a preamble.

(6) The communication device according to (4),
wherein the near field communication is standardized in accordance with ISO/IEC 14443-2, and
the header portion is a start of frame.

(7) The communication device according to any one of (1) to (6),
wherein the modulated signal is an ASK modulated signal.

(8) The communication device according to any one of (1) to (7),
wherein the modulation section includes:
a coil;
a resistor; and
a switch configured to turn on and off connection between both ends of the coil through the resistor.

(9) The communication device according to any one of (1) to (8),
wherein the communication device is an IC card.

(10) The communication device according to any one of (1) to (8),
wherein the communication device is a mobile information terminal.

(11) A communication system, including:
a first communication device: and
a second communication device,
wherein the first communication device includes
a demodulation section configured to perform, based on a modulated signal transmitted from the second communication device, amplitude change demodulation and phase change demodulation, and configured to select a demodulated signal demodulated with either one of the amplitude change demodulation and the phase change demodulation, and
a modulation section configured to modulate magnetic field generated by the second communication device.

(12) A communication method, including:
receiving a signal by performing, based on a modulated signal transmitted from an associated communication device, amplitude change demodulation and phase change demodulation, and by selecting a demodulated signal demodulated with either one of the amplitude change demodulation and the phase change demodulation; and
transmitting a signal by modulating magnetic field generated by the associated communication device.

This application claims the benefit of Japanese Priority Patent Application JP 2013-112237 filed on May 28, 2013, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication device, comprising:
a demodulation section configured to perform, based on a modulated signal transmitted from an associated communication device, amplitude change demodulation and phase change demodulation, and configured to select a demodulated signal demodulated with either one of the amplitude change demodulation and the phase change demodulation; and
a modulation section configured to modulate magnetic field generated by the associated communication device,
wherein the modulated signal includes a data portion and a header portion preceding the data portion, and the demodulation section selects one of a first demodulated signal and a second demodulated signal based on a portion corresponding to the header portion in the first demodulated signal and the second demodulated signal, the first demodulated signal being demodulated with the amplitude change demodulation, and the second demodulated signal being demodulated with the phase change demodulation, and
wherein the demodulation section selects, out of the first demodulated signal and the second demodulated signal, the demodulated signal whose header portion is detected earlier, and outputs the selected demodulated signal.

2. A communication method comprising:
generating, by demodulation circuitry, a first demodulated signal by performing first demodulation processing on a reception signal;
generating, by the demodulation circuitry, a second demodulated signal by performing second demodulation processing on the reception signal;
detecting, by preamble detection circuitry, information in the first demodulated signal and detect the information in the second demodulated signal;
generating, by the preamble detection circuitry, a control signal after detecting the information in the first demodulated signal and the information in the second demodulated signal; and receiving, by selection circuitry, the first demodulated signal and the second demodulated signal, wherein the selection circuitry is controlled by the control signal to output the first demodulated signal when the preamble detection circuitry detects the information in the first demodulated signal before detecting the information in the second demodulated signal, wherein the selection circuitry is controlled by the control signal to output the second demodulated signal when the preamble detection circuitry detects the information in the second demodulated signal before detecting the information in the first demodulated signal.

\* \* \* \* \*